Patented Jan. 17, 1928.

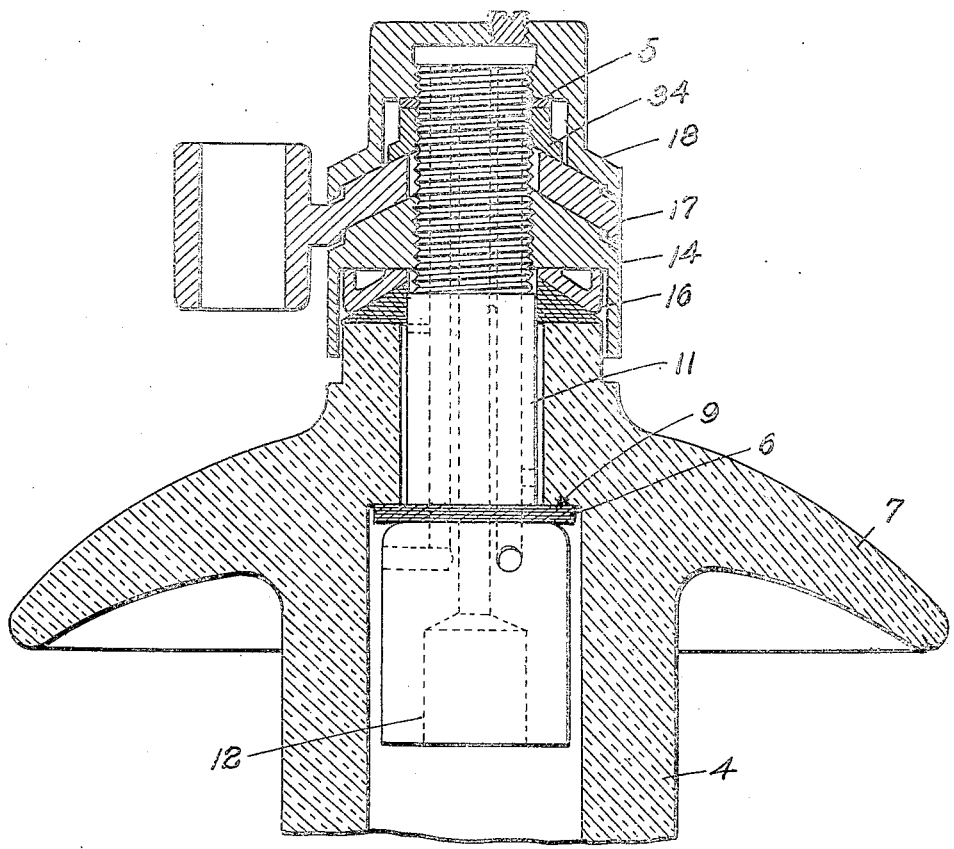

1,656,395

UNITED STATES PATENT OFFICE.

ATLEE B. SAURMAN, OF PITTSBURGH, PENNSYLVANIA, ASSIGNOR TO STANDARD UNDERGROUND CABLE COMPANY, OF PITTSBURGH, PENNSYLVANIA, A CORPORATION OF PENNSYLVANIA.

TERMINAL.

Application filed December 17, 1924. Serial No. 756,375.

My invention relates to terminals used in the installation of electrical service lines, and consists in an improvement in structure, whereby the work of making installation is facilitated and mistake is guarded against; and a terminal is provided which is more durable and less likely to get out of order in prolonged service, than otherwise would be the case.

The invention is illustrated in the accompanying drawing, which shows in vertical and medial section the upper part of a lead-out structure which forms part of a terminal, otherwise organized and arranged in a well known manner.

In Letters Patent of the United States, No. 1,159,655, granted November 9, 1915, on the application of Charles W. Davis, a terminal is shown and described, and it is upon such a terminal that my present invention constitutes an improvement.

A terminal of the nature indicated includes a lead-out structure, and the lead-out structure consists, as here shown, of a sleeve of insulating material 4, exteriorly petticoated, as at 7, and of a conducting stem 11, extending within the sleeve and hermetically secured thereto, its inner end socketed, as at 12, to receive and make electrical union with the introduced end of a cable conductor, and its outer end adapted to be electrically united with a collar 17, to which the end of an aerial line may in turn be electrically united.

The bore through the sleeve is stepped, as at 9; the conducting stem 11 is, at its inner end, enlarged, as shown, and, at its outer end is screw threaded; and upon its screw-threaded outer end a clamping nut 14 is applied. Suitable packing is provided, as indicated at 6 and 16, and by such provision the conducting stem is secured in place, and in hermatic union with sleeve 4. Ultimately, it will be understood, when installation has been made, the spaces within the terminal are filled with insulating compound.

The collar 17 encircles the stem 11 at its outer end, beyond the seated clamping nut 14, and beyond the collar 17 a second nut 34 is screwed upon the stem 11. The collar 17 is necessarily formed of conducting material, and the stem 11 of course is of conducting material. One and preferably both of the nuts 14 and 34 are formed of conducting material, and as such make electric contact with the stem upon which they are screwed. The conjoint effect of these nuts, applied to the stem with collar 17 clamped in place between them, is to complete electrical union between stem 11 and collar 17 and the aerial line when united to collar 17. Externally of nut 34 a cap-nut 18 is applied to the end of stem 11, closing the assembly, shielding from the weather the seam of the engagement of nut 34 with collar 17, strengthening the security of the assembly, and adapted to serve other ends, with which I am not here immediately concerned. Packing 5 may, if desired, be interposed between nut 34 and cap-nut 18.

It is with the particular shape and arrangement of nuts 14, 34, and 18, and of the interposed collar 17, that my invention has to do, and more specifically, with the meeting surfaces between these parts. Heretofore in such structures, and as exemplified in the Davis patent mentioned above, these meeting surfaces, between nut 14 and collar 17, and between collar 17 and nut 18, have extended perpendicularly to the axis of stem 11, and perpendicularly to the clamping strain,—which is the obvious and natural arrangement. And the surfaces so disposed extend, when installation is made, in substantially horizontal planes. As insurance against ingress of moisture, the union between surfaces is stepped or dovetailed.

I have, as the drawing shows, retained as a preferred feature the step or dove-tail in these meeting surfaces, but I have thrown the surfaces out of the plane normal to the axis of the stem, and have made them inclined surfaces. And in so doing I have gained two good ends. One is that the clamping members become complementary projecting and recessive cones, which clamp with wedging action one upon another, making more intimate union, and overcoming a difficulty otherwise present, that, in prolonged service the surfaces tend to separate, the union tends to become loosened, perhaps through vibration. The other good result attained is that the structure becomes "fool-proof" in greater degree than otherwise is true. Companies which install terminals of this sort experience some annoyance because the workmen in making installation, sometimes, carelessly, apply the ring 17 upside-down. (In this connection, it is to be remembered that installation is made out of doors, possibly at night, and in inclement weather). And in such case, of course, a fault soon develops. The ring 17 of my improved terminal is by its shape protected against such a mistake. However careless the workman may be, he cannot apply the ring 17 up-side-down, and then complete the installation.

I employ the three nuts shown, one, nut 14, underlying the aerial-joining collar 17, the other two, 34 and 18, overlying the collar, and the nut 18 encircling the applied nut 34 and itself also engaging the collar 17, and thereby reenforcing the security of the union, and together with collar 17 constituting a complete closure about the clamping nut 34 and the seam of its engagement with the collar 17.

I have in the drawing shown both the clamping nut 34 and the cap-nut 18 to be provided with such obliquely arranged and conical surfaces, and such is the arrangement I prefer. The inclination of the meeting surfaces from the central conducting stem is preferably downward.

I claim as my invention:

1. In a terminal, a lead-out structure, including a sleeve of insulating material and a stem of conducting material secured in place in the bore of said sleeve, the outer end of said stem being screw-threaded, and three nuts and an aerial-joining collar adapted to be applied successively to said stem, one of said nuts underlying and the two others overlying said collar, the collar engaging the underlying nut and both of the overlying nuts engaging the collar over complementary conical surfaces.

2. In a terminal a lead-out structure including a sleeve of insulating material with stepped bore, a shouldered and screw-threaded stem of conducting material and a nut adapted to engage said stem whereby the stem may be clamped to place in said sleeve, an aerial-joining conical collar of conducting material adapted to be applied to said stem when clamped to place, a clamping nut of conducting material and a cap-nut adapted to be applied to said stem when clamped to place and when surrounded by said collar, said clamping nut and said cap-nut adapted when applied to said stem both of them to engage the said collar, the cap-nut constituting together with the collar a complete closure about the clamping nut and the seam of its engagement with the said collar.

In testimony whereof I have hereunto set my hand.

ATLEE B. SAURMAN.